Figure 1:
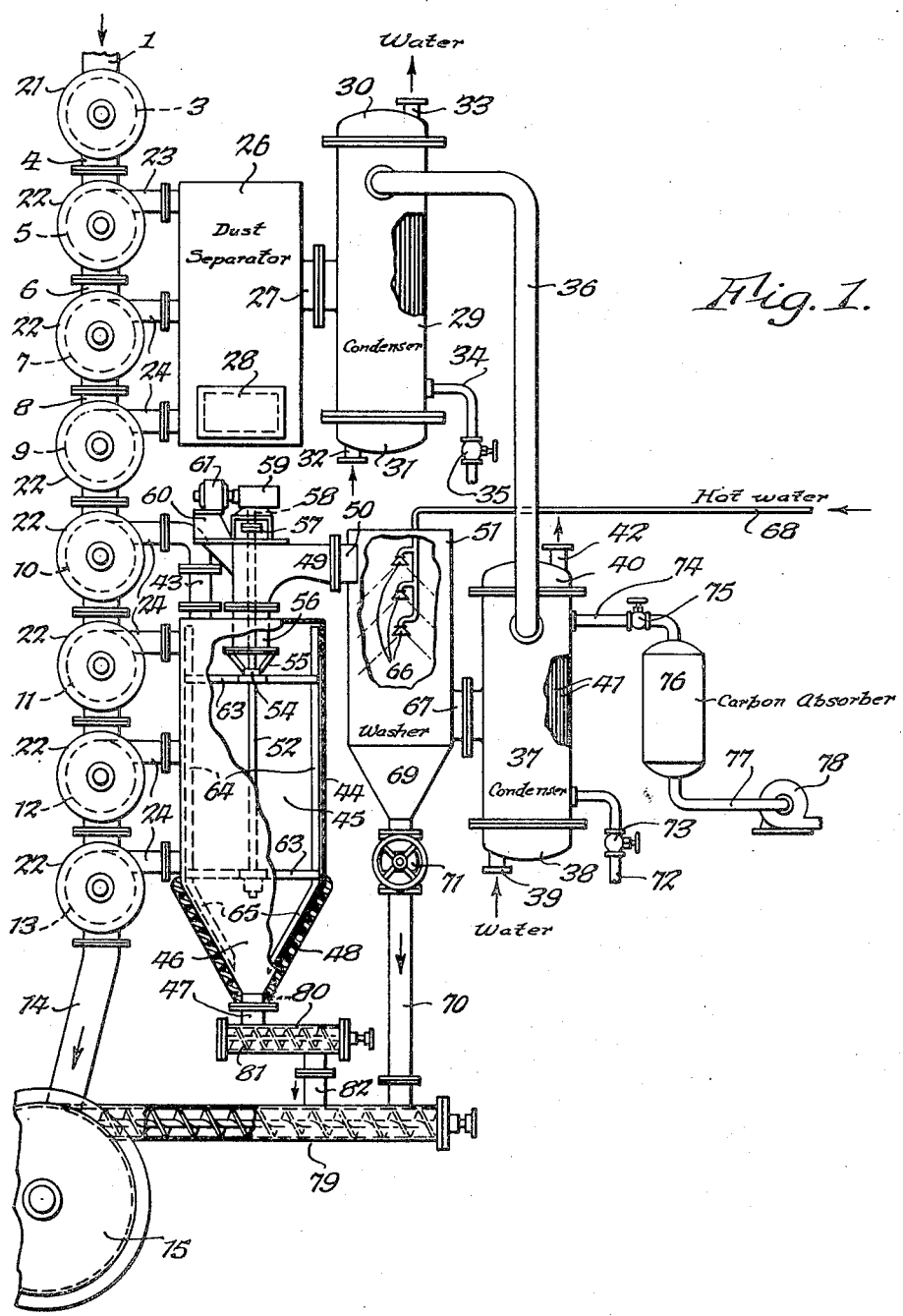

Dec. 13, 1949     H. S. ROBINSON     2,491,060
RECOVERY AND CLEANING OF CONDENSABLE GASES
Filed March 12, 1946     2 Sheets-Sheet 1

INVENTOR.
Harry S. Robinson
BY
Parker Prochnow & Farmer
Attorneys.

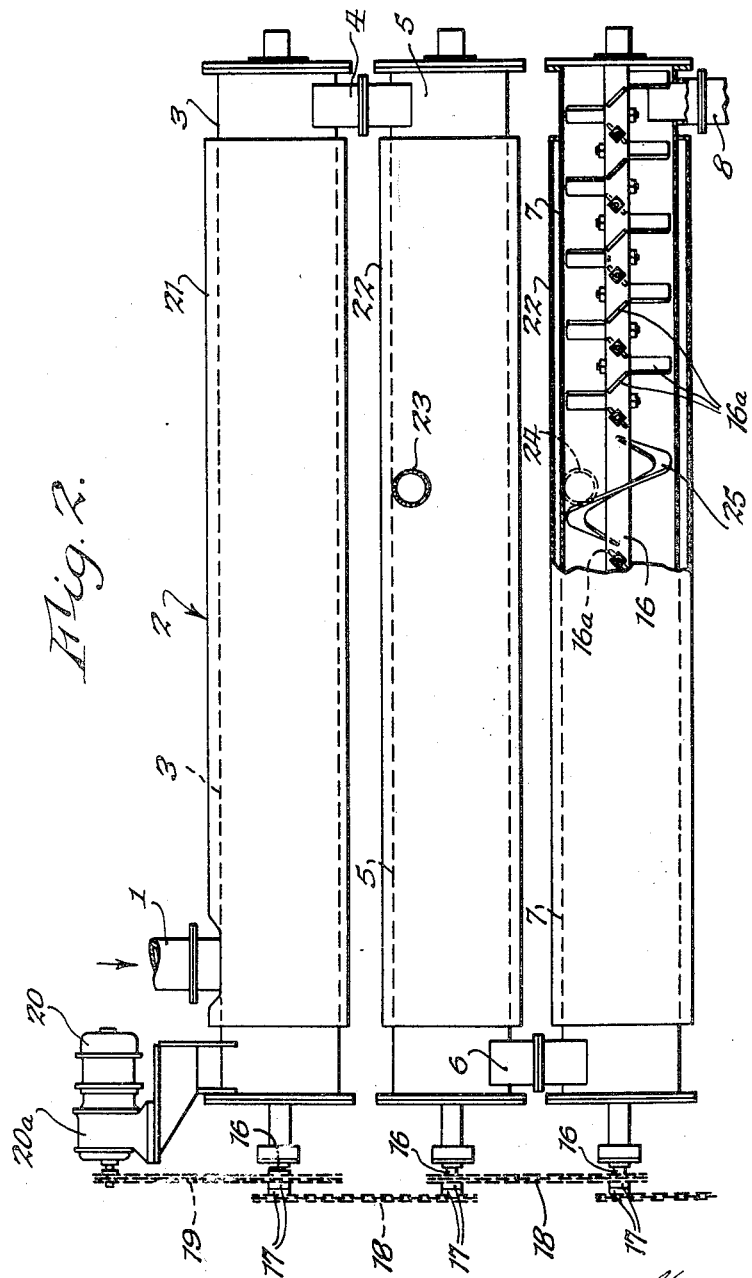

Patented Dec. 13, 1949

2,491,060

UNITED STATES PATENT OFFICE 2,491,060

RECOVERY AND CLEANING OF CONDENSABLE GASES

Harry S. Robinson, Piqua, Ohio, assignor to The French Oil Mill Machinery Company, Piqua, Ohio Application March 12, 1946, Serial No. 653,862

11 Claims. (Cl. 34—12)

This invention relates to the cleaning of condensable gases to be recovered, and more particularly to the removal, cleaning and recovery of the solvent in a solvent extraction system. In some solvent extraction systems, the solids in finely divided form or small particles are subjected to a soaking treatment with a solvent, during which the solvent removes from the solids some component of the solids, such as the fats and oils for example, and at the conclusion of the operation it is desirable to recover and reclaim for reuse, the portion of the solvent which adheres to the solids that have been processed.

The processed solids, after removal of excess solvent, are passed through a closed drying passage in which the solids are agitated at a temperature above the vaporization point of the solvent, which causes vaporization of substantially all of the solvent remaining in or on the solids, but agitation of the solids also produces a quantity of relatively fine dust, some of which is carried off with the current of solvent vapor that is removed from the passage, and which must be removed from the solvent vapor before the vapors are condensed, so as to prevent the entrained solids from fouling the condenser.

An object of the invention is to provide an improved method and means for removing the solvent remaining in or on the processed solids after the excess solvent has been drained off and cleaning the removed solvent to enable its reuse; with which substantially none of the solids treated will be lost; which may operate continuously for long periods of time without stopping and without clogging of the apparatus; and with which the apparatus may be relatively simple, compact, practical and inexpensive.

Another object of the invention is to provide an improved method and means for removing dust or finely divided solids from solvent vapors to permit the continuous condensation of such vapors; with which fouling of the condenser with dust carried over by the vapors will be prevented; and with which loss of solvent and solids will be relatively insignificant.

Another object of the invention is to provide an improved method and means for reclaiming the solvent used for solvent extraction operations and adhering to the solids treated, in a clean condition ready for reuse and with a minimum of loss of the solvent; with which the fine solids carried over from the processed material will be recovered and returned to the processed material; and which will have maximum efficiency and effectiveness, and require relatively simple apparatus and a minimum of operating attention.

Various other objects and advantages will be apparent from the following description of one embodiment of the invention, and the novel features will be particularly pointed out hereinafter in connection with the appended claims.

In the accompanying drawing:

Fig. 1 is a somewhat diagrammatic elevation of an installation constructed in accordance with this invention; and Fig. 2 is a diagram of part of the drying mechanism which is shown only partially in Fig. 1.

In the illustrated embodiment of the invention, the materials subjected to a solid extraction operation are usually in relatively small particles, because the smaller the particles, the more rapid, complete and effective is the extraction operation. In the extraction operation the solids and the solvent are maintained in prolonged contact with each other to enable the solvent to penetrate the solids and dissolve and carry out a desired component of the solids, usually oils and fats, but which may be some other component, such as caffein, which is removed from coffee beans. The particular solvents used and the materials which are treated or extracted are not part of this invention, and hence reference to any specific solvents or materials is made only as explanatory of the principle of the invention. Usually there is opposed direction of movement or flow between the solvent and the solids, so that the solids at the end of the extraction treatment are brought into contact with fresh solvent, and any solvent adhering to the solids after the treatment, will be relatively free of the dissolved component of the solids.

At the end of the extraction treatment the solvent and the solids are mechanically separated, such as by draining off the excess solvent, and then the solids, still wet with some of the solvent, are moved progressively along a closed passage in which the solids are agitated and at the same time heated to a temperature above the vaporization temperature of the solvent, which produces an evaporation of the solvent remaining in or on the solids. The first vapors which come off are usually relatively free from entrained finely divided solids, because the solids are still quite damp with the solvent, but as the drying proceeds in such passage, the relatively fine particles of the solids are dried and begin to go over as a fine dust with the vapors. The removal of such solids or dust from the vapors is important in order to prevent fouling of the condenser and to prevent loss of the solids so carried over.

Any suitable extraction method or apparatus may be employed, but since the manner of extraction is not a part of this invention, it has not been illustrated. A part of suitable drying apparatus is illustrated in Fig. 2, in which the solids wet with the solvent from the extraction treatment are delivered through a conduit 1, to a dryer mechanism illustrated generally at 2, and which is made up of a plurality of heated runs or stages arranged one above the other and connected in series. For example the feed hopper 1 opens into one end portion of a cylindrical drying shell 3, disposed approximately horizontally and having at the end opposite the inlet 1 a discharge conduit 4 which opens into one end of another cylindrical shell 5 which extends beneath and is spaced from the shell 3. The shell 5 at its end opposite its connection to the conduit 4, opens into a conduit 6 leading to another cylindrical shell 7 immediately below, but spaced from the shells 3 and 5. The outer end of the shell 5 is connected by conduit 8 to one end of another shell 9 (Fig. 1), similar to shells 3, 5 and 7. These shells 3, 5, 7 and 9 are arranged in a superposed stack and spaced from one another, so that the solids entering one end of the upper shell 3 may pass along the same to the opposite end, then into and through the next lower shell, and so on down through the entire stack until they reach the bottom.

While only a few of these shells making up the dryer are shown in Fig. 2, a complete stack of them is shown in Fig. 1 in which shells 9, 10, 11, 12 and 13 are similarly constructed and disposed below the shells 3, 5, and 7. The discharge end of the lower dryer shell 13 is connected by a conduit to one end of a screw conveyor 15, by which the processed and dried solids are conveyed to a suitable point of disposal. Two of such vertical rows or stacks of cylindrical dryer shells may be employed side by side, and the discharge conduits 14 at the bottoms of both stacks deliver dried solids into a common screw conveyor 15, but such other stack has not been illustrated because it and the apparatus attached thereto would be a mere duplication of the apparatus shown in Figs. 1 and 2.

A shaft 16 is disposed endwise and axially in each shell in the stack, such as 3, 5, 7 and 9 to 13, which shafts extend through the closed ends of the shells where they mount sprocket wheels 17 that are connected to each other by chains 18, and by a chain 19 to an operating motor 20.

The motor 20 operates through a suitable speed reduction mechanism 20a so as to slowly rotate the shafts 16. The shaft 16 in each shell carries a series of paddles 16a (see shell 7 in Fig. 2) with bevelled faces resembling propellor paddles or blades of a boat, so that as the shaft rotates, these paddles will act like sections of a spiral screw and propel the solids along the shell 3 from the inlet conduit 1 to the discharge conduit 4. The paddles will, of course, all be similarly constructed and bevelled so as to progressively move the solids along the shell from end to end and they will, at the same time, agitate and stir the loose solids in the shell so as to bring the solids progressively into contact with the inner periphery of the shell for heating thereby during their movement along the shell.

The drying shell 3 provided with an encircling jacket 21 to which steam is admitted, so that the peripheral wall of the shell will be heated, and through contact with this heated shell the solids will be heated. All of the other shells 5, 7, and 9 to 13, will be similarly heated by jackets 22. In the second shell from the top, which in this example is the shell 5, there is a vapor outlet pipe 23, preferably located intermediate the ends of the shell 5 and opening from the upper part thereof as shown in Fig. 1, by which the solvent vapor may be removed. Similarly all of the other shells 7, 9, 10, 11, 12 and 13 are also provided intermediate of their ends, with outlet pipes 24. The shafts 16 in the shells 5 and 7 are provided with paddles 16a similar to those in the shell 3, arranged along the shaft 16 except for a small section adjacent and passing the outlet 23 where the shaft 16 carries a spiral fin 25 instead of paddles. This short spiral fin 25 on the shaft acts as a screw conveyor where the solids are passing the vapor outlet opening 23, and there will be less tendency for the solids to move out through this vapor outlet when the spiral fin is employed than there would be if the paddles were used for the entire lengths of the shell. Paddles and a fin section are similarly provided on each of the shafts 16 in each of the other shells below the shell 5.

The vapor outlet pipes 23 and 24 from the shells 5, 7 and 9 are connected to and open into the plenum chamber of a casing 26 which also has a vapor outlet into the conduit 27 at the opposite side, or spaced, from the connections to the pipes 23 and 24. This casing 26 may have a transparent but removable window 28 adjacent its bottom which may be opened in order to provide access to the plenum chamber for removing any dust that settles out therein. The vapor outlet pipe 27 from casing 26 opens into a condenser 29 of any suitable construction. In the type illustrated, the condenser is provided with heads 30 and 31 connected by a plurality of tubes, so that a cooling water admitted to the head 31 through a pipe 32 may pass through the tubes to the opposite head 30 and then out through the water outlet 33.

The vapors entering the shell of the condenser will pass around the tubes so as to be cooled thereby and when condensing, by heat exchange with the water in the tubes, will settle to the bottom from which they may be removed by a suitable outlet pipe 34 controlled by a valve 35. The upper end of the vapor chamber around the tubes is connected by an outlet pipe 36 to a second condenser 37 of similar construction, but disposed at a lower level. The condenser 37 is cooled by water entering the lower header 38 through the water inlet 39, the water passing upwardly from lower head 38 to the upper head 40 through tubes 41, and then out through the water outlet 42.

The vapor outlet of the drying shell 10 is connected by a pipe 43 to another dust collector having a casing 44, and the pipes 24 of the shells 11, 12 and 13 are similarly connected to the plenum chamber 45 in this shell 44. These various pipes 24 open into the chamber 45 at different spaced ports, and the casing 44 has a conical bottom 46 leading to an outlet pipe 47. This bottom 46 is downwardly convergent and heated by a suitable heating element 48. Any suitable heating device 48 may be employed, such as one having steam coils therein or one having an electric resistance wire incorporated therein, or in fact any other suitable means may be provided for heating this bottom wall 46.

The upper end of the casing 44 is connected by an elbow 49 and a pipe 50 to the upper end of a vapor or gas washer 51. A shaft 52 extends downwardly into the plenum chamber 45 through the elbow 49, and is rotatably supported in a bearing in the upper wall of the elbow, and also in a bearing 54 supported by a spider 55 carried on the lower end of a pipe 56 that extends downwardly into the plenum chamber 45 from the elbow 49. The shaft 52 is coupled by a coupling 57 to a shaft 58 of a speed reduction device 59 that is supported by a bracket 60 on the elbow 49.

This speed reduction mechanism 59 is operated by a motor 61 to which it is coupled. Thus as the motor 61 operates it will slowly rotate the shaft 52. This shaft 52 extends approximately to the level of the upper end of the bottom 46, and carries approximately radial arms 63 which, in turn, are connected at their outer ends to blades 64 that extend along and in close proximity to the side wall of the casing with extensions 65 along and in close proximity to the downwardly convergent bottom 46. The scraper blades 64 with extensions 65 serve to scrape from the bottom and side walls of the casing, any adherent solids, which collect upon the bottom wall 46.

The washer 51 may be of any suitable construction for washing or scrubbing the solvent vapors to remove any dust entrained therein or carried in suspension thereby, and in the type illustrated is provided with a plurality of nozzles 66 arranged in a vertical row along the vertical axis of the washer chamber, and each spraying a liquid as a conical sheet. Thus there will be created a superposed group of conical liquid sheets, spaced apart vertically and disposed across the chamber of the washer between the inlet pipe 50 and a vapor outlet pipe 67, which requires the vapors to pass through all of these sheets of liquid in order to reach the outlet 67. Water or other washing liquid is supplied to the nozzles 66 by a pipe 68 leading to a suitable source, and the liquid supplied is at a temperature above that at which the vapors will condense, so that the washing of the vapors with this spray will not condense any of the vapors but will merely remove the solids suspended or entrained therein. The liquid from the spray will collect in the conical bottom 69 having an outlet pipe 70 controlled by a valve 71.

The vapor outlet 67 from the washer opens into the chamber of condenser 37 that surrounds the vertically extending tubes 41, and the cleaned vapors are condensed and collect in the bottom of the shell of the condenser 37 from which they are removed by a pipe 72 controlled by a valve 73 leading to a storage tank for the solvent. The pipe 36 from the upper condenser 29 opens into the upper part of the vapor chamber of the condenser 37, so that if any vapors pass the upper condenser in vapor form, they will be condensed in the condenser 37. The condensation of the solvent vapors in the chambers of condensers 29 and 37 will produce a partial vacuum or suction which will be communicated through the washer 51, the dust collectors 26 and 45, to the various stretches or runs of the passage through which the solids are being progressively moved during the drying.

The vapor chamber of the condenser 37 is provided with a vent pipe 74 controlled by a valve 75 which leads to a carbon adsorber 76 which, in turn, is connected by a pipe 77 to a device 78, such as a pump or barometric condenser, which creates a suction in the vapor chamber of the condenser and removes any air or uncondensed gases or vapors that may have been carried over into and remain uncondensed in the condenser. Since the condensation of the vapors will create a suction, it is only necessary to operate the suction device 78 at intervals, such as when starting, or when the condenser contains a substantial quantity of air or uncondensible vapor. The carbon adsorber serves to remove any of the solvent vapor that might be carried over during the short intervals in which the suction device 78 is operating.

It is desirable that none of the solids subjected to the extraction process be lost, and therefore the sludge formed of the solids and liquid, such as water, collecting in the bottom 69 of the washer will be conveyed by the pipe 70 to a conveyor 79 which discharges into the larger conveyor 15 that receives the solids discharged from the dryer shell 13. Similarly the outlet 47 at the bottom of the casing 44 opens into a screw conveyor 80 of the lock seal type which has a spiral screw 81 therein that slowly removes the dust from the bottom of the plenum chamber 45 and delivers it into a pipe 82 while sealing opening 47. The discharge pipe 82 is also connected to the conveyor 79 so that the solids removed from the plenum chamber 45 will also be returned to the dry solids discharged through the conduit 14 into the conveyor 15. It will be observed that with such connections all of the solids coming from the solvent extraction operation will be delivered at the discharge end of the apparatus, and substantially all of the solvent will be removed, cleaned and recovered to enable its reuse after the component that was dissolved in the solvent has been separated from the solvent.

In the operation of this improved apparatus, the solvent remaining in and on the solids following a solvent extraction operation will move with the solids through the conduit 1 (Fig. 2) into the dryer formed of a vertical row or group of approximately horizontal, heated cylinders. The solids will be moved slowly through the passage formed by this series of drying shells, during which the solids are agitated as well as heated, so that the heating will be uniform throughout the solids in order that all of the solvent may be entirely vaporized. The solids with the adherent solvent are heated in this manner above the vaporizing temperature of the solvent, and thus all of the solvent on the surface of the solids will be vaporized and removed through the outlet pipes 23 and 24, and the solvent in the interior of the solids will also be vaporized and removed in a similar way.

Little or no solvent vapor is formed in the upper dryer shell 3, because during the travel of the solids in that shell the solids and solvent are being brought up to the vaporization temperature for the solvent. The vapors passing off from the shells 5, 7 and 9 carry little or no dust with them because the solids are still quite wet with the solvent, which lays any dust in the solids, but whatever solids are carried off from those shells will be largely settled out in the plenum chamber of casing 26. When solids have collected in the casing 26 to any substantial extent, they may be removed after opening the clean out door 28. The vapors passing through the casing 26 will move into the condenser 29 where they are condensed and drained off through the pipe 34.

Any vapors that are not condensed will pass on through pipe 36 to the lower condenser 37 where they are fully condensed, if they are condensible, and those that are not condensible may be removed at intervals through the pipe 74. The vapors from the drying shells 10, 11, 12 and 13 are removed through the collector 44 having a plenum chamber 45, and the larger particles of the dust carried over by these vapors will settle out in chamber 45, and the vapors with the remaining or lighter solid or dust particles will move on into the gas washer 51. The dust of the solids being processed will be carried off largely by the vapors leaving the shells 10 to 13, because at this stage in the processing of the solids, the solids are becoming dryer, and when the dust is dry it will, through the agitation of the solids, pass off to some extent with the vapors. The scraper 64, 65 prevents a building up on the side walls and bottom of chamber 45 of the dust particles separated out in the chamber 45. The solids collected on the bottom 46 will be heated by the heater 48, so that any solvent adhering to such solids will be vaporized and will pass off with the other vapors into the washer 51.

In the washer 51 there is no recirculation of the washing liquid, and water is the usual liquid employed for the washing or scrubbing of the gas or vapors. This water or liquid, of course, is at a temperature above the condensation temperature of the solvent vapors, and therefore the solids are washed out without condensation of the vapors. The sludge formed of the water and washed out solids will collect in the bottom 69 of the washer, and will pass therefrom through the valve 71 and pipe 78 into the conveyor 79 which delivers the sludge to the dried solids discharged from the lower drying shell 13. The solids from the bottom of the chamber 45 are also removed through the conveyor seal 88, and are similarly delivered to the processed solids. Thus substantially all of the solids treated will be discharged by the conveyor 15, and the mixture of the sludge from the washer with the dried solids restores humidity to the solids in the conveyor 15 sufficiently to facilitate handling of the solids, and the working of them into suitable shapes when the solids are pressed into cakes.

For example if the solids are to be used for stock feed, a little moisture mixed therewith aids in forming the processed solids into cakes and does no harm. All of the solids carried over by the vapor will be removed before reaching the condenser, and thus will not foul the condenser. With such an arrangement, the apparatus may operate continuously for relatively long intervals of time without shutting down for cleaning of the condenser or other parts. By using fresh water continuously in the washer 51, there will be no fouling or plugging of the spray nozzles.

It will be understood that various changes in the details, materials and arrangements of parts, which have been herein described and illustrated in order to explain the nature of the invention, may be made by those skilled in the art within the principle and scope of the invention, as expressed in the appended claims.

I claim:

1. In a system for cleaning condensable gases to be recovered, a closed casing having a plenum chamber of substantial size and spaced inlet and outlet ports opening therein both above its bottom, a source of dust laden condensable gases connected to the inlet port of said chamber, a gas washer connected to the outlet port of said chamber to wash the gases with a liquid which will not absorb the gases, a condenser connected to said washer to remove and condense washed gas therefrom, separately from the wash liquid and having entirely separate heat exchange passages, one of said passages being connected to the outlet of said washer, and the other passage being connected to a source of cooling fluid, said casing having a downwardly convergent bottom below said ports for collecting dust particles settling out in said chamber, with a discharge opening in said bottom for the removal of the settled out dust particles, and a source of heat acting on said convergent bottom for heating dust particles settling thereon to drive off any condensed gases adhering to said settled particles.

2. A system for removing a condensable solvent to be recovered, from a finely divided mass of solids which are wet with said solvent, and cleaning said solvent, which comprises means for progressively heating and agitating said mass to vaporize said solvent carried by the solids of said mass and discharging the dried solids progressively, a closed casing connected to said means for progressively receiving therefrom the vaporized solvent with entrained solids, and having a plenum chamber of substantial size in which some of the solids may settle out from the vapors, a gas washer connected to said casing to receive said vapors with remaining entrained solids, and for washing out said remaining solids with a liquid at a temperature above that at which said solvent vapors will condense, a condenser connected to said washer for removing and condensing said washed vapors from said washer, and means for delivering to the discharged, dried solids, the solids removed in said casing and in said washer.

3. In a method for removing a condensable solvent, to be recovered, from a finely divided mass of solids discharged from a solvent extraction treatment, the improved steps which comprise passing the solvent carrying solids along a closed passage and agitating the solids during movement along such passage, heating the solids during such movement to vaporize the solvent adhering to said solids, removing the vapors from said passage, mechanically separating out the heavier entrained solids passing off with said vapors, washing the resultant vapors having any remaining solids suspended therein with fresh liquid free of said solids, at a temperature above that at which said solvent vapors will condense, collecting and condensing the washed vapors, and adding the wash water with its suspended solids, and the mechanically separated solids, to the dried solids delivered by said passage and from which the vapors were removed.

4. In a method for removing a condensable solvent, to be recovered, from a finely divided mass of solids discharged from a solvent extraction treatment, the improved steps which comprise passing the solvent carrying solids along a closed passage and agitating the solids during movement along such passage, heating the solids during such movement to vaporize the solvent adhering to said solids, removing the vapors from said passage, mechanically separating out the heavier entrained solids passing off with said vapors, heating the mechanically separated solids to eliminate therefrom any solvent remaining thereon, and adding such vapors to those which are subjected to washing, washing the resultant vapors having any remaining solids suspended therein with fresh liquid free of said solids, at a temperature above that at which said solvent vapors will condense, collecting and condensing the washed vapors, and adding the wash water with its suspended solids, and the mechanically separated solids, to the dried solids delivered by said passage and from which the vapors were removed.

5. A system for treating solids from a solvent extraction operation to remove and recover the solvent, which comprises a closed passage along which the solvent carrying solids from said extraction treatment are passed and in which the solids are agitated during such passage, means for heating the solids while in said passage to vaporize the solvent carried thereby, a dust collector connected to said passage for removing therefrom the vaporized solvent with any dust from said solids entrained therein, a washer connected to said dust collector for receiving the vapors from said collector with remaining solids suspended therein and washing the vapors with a liquid at a temperature above the condensation temperature of said vapors, a condenser connected to said washer for removing the washed vapors and condensing and collecting them, a connection from the washer to said passage for delivering the washer liquid and solids collected thereby to said passage at a zone following that at which the vapors were removed, and a connection from said collector to said passage for also delivering back into the passage the solids separated out in said collector.

6. A system for treating solids from a solvent extraction operation to remove and recover the solvent, which comprises a closed passage along which the solvent carrying solids from said extraction treatment are passed and in which the solids are agitated during such passage, means for heating the solids while in said passage to vaporize the solvent carried thereby, a dust collector connected to said passage for removing therefrom the vaporized solvent with any dust from said solids entrained therein, and operable to remove some of the entrained solids, a washer for receiving the vapors from said collector with remaining solids suspended therein and washing the vapors with a liquid at a temperature above the condensation temperature of said vapors, a condenser connected to said washer for removing the washed vapors and condensing and collecting them, a connection from the washer to said passage for delivering the washer liquid and solids collected thereby to said passage at a zone thereof following that at which the vapors were removed, and a connection from said collector to said passage for also delivering back into the passage the solids separated out in said collector, said collector having its lower part heated to prevent condensation of vapors on the separated out solids.

7. In a system for cleaning condensable gases to be recovered, a closed casing having a plenum chamber of substantial size and spaced ports opening therein, a source of dust laden condensable gases connected to one of said ports, a gas washer connected to another port of said chamber, a condenser connected to said washer for receiving therefrom and condensing the washed gases, a source of fresh, clean washing liquid connected directly to said washer for delivering said liquid directly thereto, and a connection for receiving and mixing the liquid from said washer and dust separated from the gas in said plenum chamber.

8. A system for removing a condensable solvent, to be recovered, from a finely divided mass of solids which are wet with said solvent, and for cleaning said solvent, which comprises a closed passage through which the solids wet with said solvent may be moved progressively and agitated while in movement, a vapor washer, a connection from said washer to said passage for removing dust laden vapors from said passage and conveying them to said washer, a condenser connected to said washer for removing therefrom and condensing said solvent vapors, a source of fresh, cleaning washing liquid at a temperature above the condensing temperature of said solvent connected to said washer, said washer having spray means connected to said liquid source for spraying said fresh liquid across the path of movement of the gases through said washer so as to wash out suspended solids, and means for collecting the used wash liquid with entrained solids and delivering them back to said passage in a portion thereof following that in which there was removal of vapors.

9. A system for treating solids from a solvent extraction operation to remove and recover the solvent, which comprises a closed passage along which the solvent carrying solids from said extraction treatment are passed and in which the solids are agitated during such passage, means for heating the solids while in said passage to vaporize the solvent carried thereby, a pair of mechanical dust separators, one connected to receive vapor from said passage in the first half of the solids travel through said passage, and the other connected to receive vapor from a plurality of portions of said passage further along in the travel of solids therethrough, a pair of condensers each of the type having separate vapor and cooling heat exchange chambers, one of said condensers having its vapor chamber connected to receive vapors leaving said one separator and discharge any non-condensed vapors into the vapor chamber of the other condenser, a washer connected to receive vapors from the other of said separators and deliver them to said vapor chamber of said other condenser, means for passing a cooling fluid through the cooling chambers of said condensers, means for spraying a washing liquid across the stream of vapors in said washer to wash out entrained solids, and means for creating a partial vacuum in the vapor chamber of said other condenser and removing uncondensed gases therefrom.

10. A system for treating solids from a solvent extraction operation to remove and recover the solvent, which comprises a closed passage along which the solvent carrying solids from said extraction treatment are passed and in which the solids are agitated during such passage, means for heating the solids while in said passage to vaporize the solvent carried thereby, a pair of mechanical dust separators, one connected to receive vapor from said passage in the first half of the solids travel through said passage, and the other connected to receive vapor from a plurality of portions of said passage further along in the travel of solids therethrough, a pair of condensers each of the type having separate vapor and cooling heat exchange chambers, one of said condensers having its vapor chamber connected to receive vapors leaving said one separator and discharge any non-condensed vapors into the vapor chamber of the other condenser, a washer connected to receive vapors from the other of said separators and deliver them to said vapor chamber of said other condenser, means for passing a cooling fluid through the cooling chambers of said condensers, means for spraying a washing liquid across the stream of vapors in said washer to wash out entrained solids, means for creating a partial vacuum in the vapor chamber of said other condenser and removing uncondensed gases therefrom, and means for conducting the solids collected in said other separator and the spray liquid and solids entrained therein from said washer, to the body of solids leaving said passage.

11. A method of recovering a condensible solvent from a mass of solids wet thereby, which comprises agitating and heating said wet solids in a confined space to vaporize the solvent adhering to the solids, removing the solvent vapors from said space, mechanically separating and heating heavier entrained solids from the separated vapors, then washing the resultant vapors with an entirely fresh liquid free of solids at a temperature above that at which the solvent vapors will condense and which will not absorb the vapors, collecting and removing the washed vapors to free them of the wash liquid, adding the wash liquid and entrained solids to the first solvent-freed solids, and then condensing and recovering the washed vapors free of said wash liquid and any entrained solids.

HARRY S. ROBINSON.

REFERENCES CITED

The following references are of record in the file of this patent:

UNITED STATES PATENTS

| Number | Name | Date |
| --- | --- | --- |
| 327,948 | Johnstone | Oct. 6, 1885 |
| 470,608 | Wardhaugh | Mar. 8, 1892 |
| 962,118 | Bradley | June 21, 1910 |
| 1,145,903 | Lehrack et al. | July 13, 1915 |
| 1,151,417 | Stokes | Aug. 24, 1915 |
| 1,165,401 | Fender | Dec. 28, 1915 |
| 1,297,639 | Blumenberg, Jr. | Mar. 18, 1919 |
| 1,927,313 | Hagen et al. | Sept. 19, 1933 |
| 1,940,199 | Wagner | Dec. 19, 1933 |
| 2,098,024 | Bailey | Nov. 2, 1937 |
| 2,321,893 | Bimpson | June 15, 1943 |
| 2,334,015 | Levine et al. | Nov. 9, 1943 |